April 7, 1959     C. K. CRUMMER ET AL     2,880,544
DECOY
Filed Sept. 12, 1955
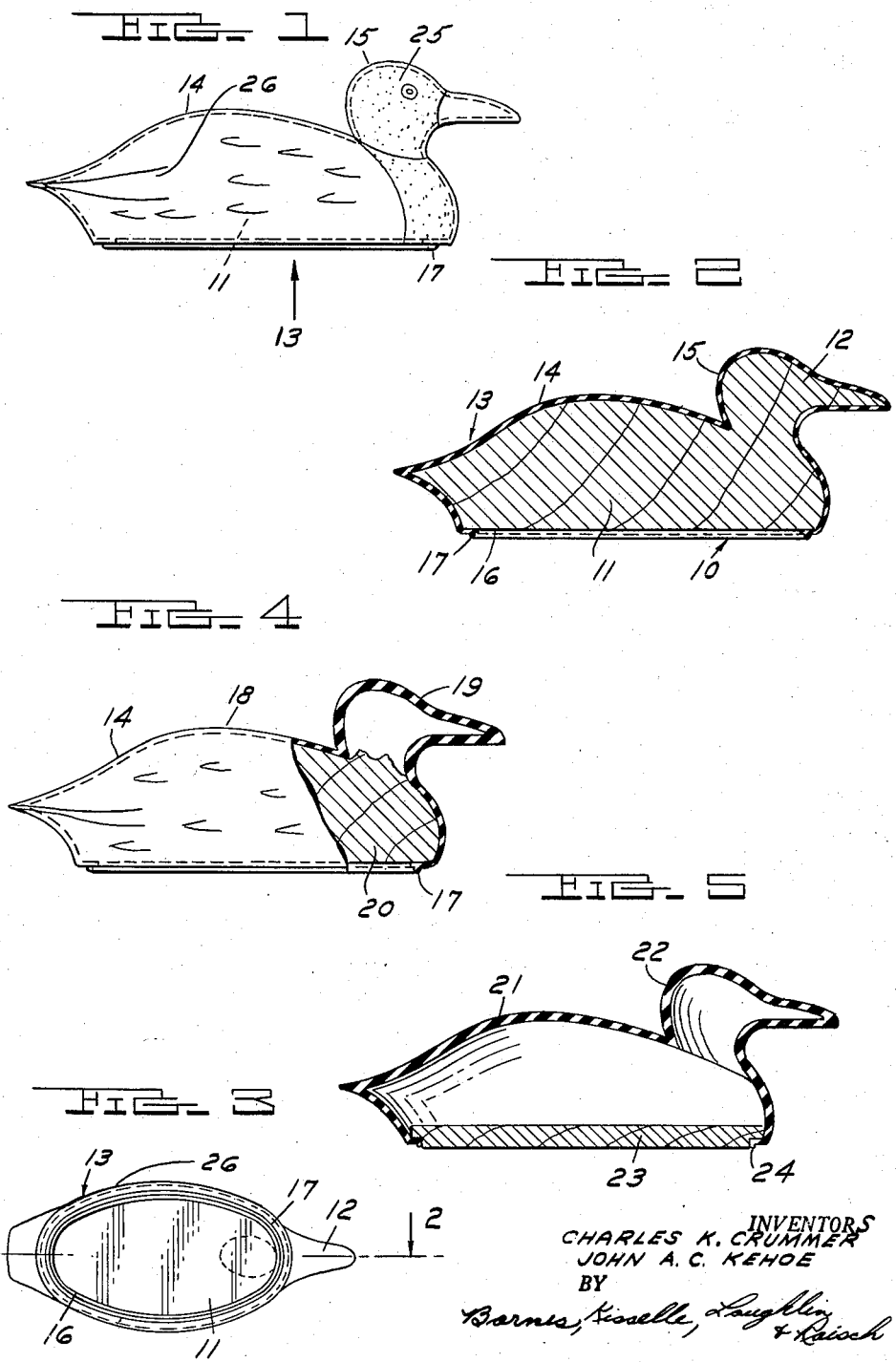

2,880,544

DECOY

Charles K. Crummer and John A. C. Kehoe,
Chatham, Ontario, Canada

Application September 12, 1955, Serial No. 533,821

14 Claims. (Cl. 43—3)

This invention relates to decoys and particularly to decoys which are used for hunting wild game such as ducks and geese.

The decoys which are presently used for hunting wild game such as ducks and geese are made of a buoyant material such as wood and comprise an elliptical body and a head having the general configuration of a wild duck or goose. The decoy is usually painted to simulate the particular bird which is being hunted. Accordingly, it is necessary to have separate decoys for each type of bird which is to be hunted. The decoys, being made of wood, are usually subjected to breakage and require frequent repainting and repair.

It is therefore an object of this invention to provide a means for readily converting a decoy for use in hunting different types of birds.

It is a further object of the invention to provide means wherein old decoys may be quickly and easily converted for reuse without major repairs or repainting.

It is a further object of the invention to provide such a means wherein old decoys may be easily converted for use in hunting different types of birds.

Basically, the invention comprises providing a hollow cover of elastic material having substantially the same configuration as the decoy and provided with an opening in an area corresponding to the undersurface of the decoy. The opening in the cover is of less cross sectional area than the greatest cross sectional area of the decoy whereby the cover may be mounted on the decoy and held in place by the inherent elasticity of the cover.

In the drawings:

Fig. 1 is a side elevational view of a decoy having the cover thereon.

Fig. 2 is a sectional view along the line 2—2 in Fig. 3.

Fig. 3 is a plan view of the underside of the decoy in Fig. 1.

Fig. 4 is a part sectional elevational view of a modified form of the invention.

Fig. 5 is a sectional elevational view of a further modification of the invention.

As shown in Figs. 1, 2 and 3, a decoy 10 of the commonly used type is made of a buoyant material such as wood and comprises an elliptical body 11 and a head 12 whereby the general configuration of the decoy is substantially the same as the wild game which is to be hunted. According to the invention, a hollow cover 13 is provided having a body 14 and a head 15 of the same general size and configuration as the decoy 10. The cover 13 is made of a resilient material such as rubber or plastic and is provided with an opening 16 in the area corresponding to the undersurface of the decoy 10. A rib or beaded edge 17 surrounds the opening 16 in the cover 13.

Since the cover 13 has the same general size and configuration as the decoy 10, it may be readily slipped over the decoy and maintained thereon due to the inherent elasticity of the material. The opening 16 has a cross sectional area less than the largest cross sectional area of the decoy 10 so that the cover is maintained tightly on the decoy. The rib 17 increases the stiffness of the lip surrounding the opening 16 and further aids in maintaining the cover tightly on the decoy.

The outer surface of the cover 13 may be molded, painted, stenciled or otherwise provided with necessary colors and designs as at 25, 26 to simulate various wild ducks or geese. By having covers with different colors and designs, the same decoy may be used for hunting different birds merely by changing from one cover to another.

The decoy 10, on which the cover 13 is mounted, may be of the type currently used or may be an old decoy which has become marred or broken or from which the paint has been removed by wear and tear incident to use. The decoy may have portions thereof broken and need not be repaired before the cover 13 is applied thereto.

In the form of the invention shown in Fig. 4, the cover 18 has the head 19 thereof made of a material of increased thickness such that it is form-retaining and is especially intended for use with a decoy 20 which has had the head thereof broken off in use. By use of such a cover 18, the decoy 20 which would otherwise have had to be discarded or extensively repaired may be reused. The increased thickness of the head 19 makes the head 19 form-retaining even though the head of the decoy 20 is broken off.

In the modification shown in Fig. 5, the entire body 21 and head 22 of the cover are made of a material which has form-sustaining characteristics, whereby the cover may be stretched over either the decoy 10 or 20, such as shown in Figs. 2 and 4, respectively, or as shown in Fig. 5, over any flat elliptical body, such as 23, which, for convenience, may have a peripheral undercut groove 24.

It can readily be seen that we have provided means whereby decoys of the type currently used may be adapted for use in hunting different types of birds. In addition, we have provided means whereby old decoys may be quickly and easily adapted for reuse in hunting different types of birds. The decoys need not be repaired or repainted before the covers are used.

Where the cover is to be used over a decoy, it may be of such a size and configuration to fit snugly over a small size decoy such as for bluebill ducks. The cover may then be used either on small size duck decoys or on larger size duck decoys. When used on larger size duck decoys, the body and head of the cover are stretched over the decoy.

It will be understood that the resilient material of the decoy cover may be quite thin even when the decoy body is in the form shown in Figs. 4 and 5 because the air trapped in the cover will assist in maintaining the shape of the upper portion and/or the head of the molded decoy cover. The important features being that the molded cover be of sufficient resilience to stretch over a buoyant block of some shape, and of such thickness as to be shape-retaining when in the water, even though the buoyant block does not fill all the spaces of the molded cover. In all preferred forms, the decoy cover may be collapsed or folded and carried in a pocket.

We claim:

1. A duck decoy or the like comprising a buoyant body, the size and configuration of said body being similar to a duck or the like, said body including a head and an undersurface, and an integral hollow cover of elastic material having a configuration geometrically similar to said body and of less size than said body throughout corresponding areas thereof, said cover having an opening therein in an area corresponding to the undersurface of said body, said opening having a cross sectional area less than the greatest cross sectional area of the body, said cover being mounted upon said body and held in place solely by the inherent elasticity of said cover, the buoyancy of said body being sufficient to support said body and cover without sinking, all lower portions of said cover terminating adjacent the undersurface of said body whereby said cover permits said decoy to have a natural action in the water.

2. The combination set forth in claim 1 wherein said cover is formed with a beaded edge in the portion thereof surrounding said opening.

3. The combination set forth in claim 1 wherein the outer surface of said cover is provided with markings to simulate the duck or the like.

4. The combination set forth in claim 1 wherein the outer surface of said hollow cover is molded to simulate a wild duck or the like.

5. The combination set forth in claim 1 wherein the outer surface of said hollow cover is decorated to simulate a wild duck or the like.

6. An integral cover for use with a duck decoy or the like which has an undersurface, said cover being made of resilient material and comprising a hollow generally ellipsoidal body and a head at one end of said hollow body, said hollow body having an opening therein in an area corresponding to the undersurface of the duck body or the like which it is to simulate, the cross sectional area of said opening being less than the largest cross sectional area of said hollow body, whereby said cover may be mounted over a solid decoy body formed from buoyant material and of substantially the same size as the body of said cover and held in place solely by the inherent elasticity of said cover, all lower portions of said cover terminating adjacent said opening whereby said cover when mounted on said decoy body permits said decoy to have a natural action in the water.

7. The cover set forth in claim 6 wherein the outer surface of said cover is provided with markings to simulate a wild duck or the like.

8. The cover set forth in claim 6 wherein said cover is provided with a beaded edge in the area surrounding said opening.

9. An integral cover for use with a duck decoy or the like which has an undersurface, said cover being made of elastic material and comprising a hollow generally ellipsoidal body and a head at one end of said hollow body, the cover including said body and head being of such a thickness that it is form-retaining, said cover having an opening in the area thereof corresponding to the undersurface of said duck, whereby said cover may be applied to a decoy body which is formed from solid buoyant material and has a cross sectional area greater than the cross sectional area of said opening and maintained in position thereon solely because of the inherent elasticity of said cover, all lower portions of said cover terminating adjacent said opening whereby said cover when mounted on said body permits said decoy to have a natural action in the water.

10. A duck decoy comprising a generally ellipsoidal body of solid buoyant material, the size and configuration being similar to a duck or the like, and an integral hollow cover of elastic material mounted on said body, the buoyancy of said body being sufficient to support said body and cover without sinking, said cover having a body portion and a head portion, said body portion of said cover being generally ellipsoidal in shape and having a configuration similar to said body of said decoy, the size of said body portion of said cover being slightly less than the size of the body of said decoy, said body portion of said cover being of such a thickness that said body portion is stretched over said body of said decoy and is maintained in place solely by the inherent elasticity of said cover, said cover having an opening therein lying in a plane generally parallel to the major axis of said body of said decoy and on the side of said cover diametrically opposite said head portion of said cover, all lower portions of said cover terminating at said opening thereby permitting said decoy to have a natural action in the water.

11. The combination set forth in claim 10 wherein the thickness of said body portion of said cover is such that said body portion is collapsible under its own weight when removed from the decoy body.

12. The combination set forth in claim 10 wherein said head portion of said cover is of such a thickness that it is form-retaining.

13. The combination set forth in claim 10 including a beaded edge formed in the area of said body portion of said cover surrounding said opening, thereby providing increased stiffness in said body portion of said cover in the area surrounding said opening.

14. An integral cover for a duck decoy or the like, said cover being made of resilient material and comprising a hollow generally ellipsoidal body and a head at one end of said hollow body, said head being of such a thickness that it is form-retaining, whereby said cover may be mounted over a solid decoy having a body of substantially the same size and configuration as said cover and wherein the head of the decoy is broken or removed and whereby said cover is held in place solely by the inherent elasticity of said body of said cover.

References Cited in the file of this patent

UNITED STATES PATENTS

| Number | Name | Date |
|---|---|---|
| 547,033 | Ross | Oct. 1, 1895 |
| 747,732 | Kremer | Dec. 22, 1903 |
| 1,611,117 | Kearns | Dec. 14, 1926 |
| 2,201,164 | Fox | May 21, 1940 |
| 2,274,246 | Riddell | Feb. 24, 1942 |
| 2,578,411 | Fisher | Dec. 11, 1951 |
| 2,706,357 | Nigh et al. | Apr. 19, 1955 |